United States Patent [19]

Evarts

[11] 3,920,290
[45] Nov. 18, 1975

[54] BALL TRANSFER UNIT
[75] Inventor: Kingsley S. Evarts, Pittsburgh, Pa.
[73] Assignee: J & M Hydraulic Servic, Inc., Pittsburgh, Pa.
[22] Filed: Feb. 11, 1974
[21] Appl. No.: 441,458

[52] U.S. Cl. .......... 308/6 R; 308/189 R; 308/207 R; 193/35 MD; 16/26
[51] Int. Cl.² ........................................ F16C 21/00
[58] Field of Search.... 308/6 R, 189 R, 203, 207 R, 308/216; 193/35 MD; 16/26, 27

[56] References Cited
UNITED STATES PATENTS

| | | | |
|---|---|---|---|
| 1,224,294 | 5/1917 | Franzen | 16/27 |
| 1,963,956 | 6/1934 | Craig | 193/35 MD |
| 2,490,879 | 12/1949 | Milich | 308/6 R |
| 3,132,904 | 5/1964 | Wakamatsu et al. | 16/26 |

Primary Examiner—Evon C. Blunk
Assistant Examiner—Robert Saifer
Attorney, Agent, or Firm—Webb, Burden, Robinson & Webb

[57] ABSTRACT

A universal ball transfer unit having a ball, a housing, means for supporting the ball rotatably within the housing and means for retaining the ball on the support means and within the housing. The supporting means comprises at least three bushings rotatably mounted in the housing and a roller pivotally mounted in each bushing perpendicular to the longitudinal axis of the bushing, the point of contact between the roller and the ball being offset from said axis to permit rotation of the ball in any direction with substantially no sliding friction in any orientation of the unit.

9 Claims, 3 Drawing Figures

BALL TRANSFER UNIT

This invention relates to a material handling system and more particularly to a component of such a system known as a ball transfer unit.

In industrial production or packaging operations, it is often necessary to move materials from one point or work station to another. For example, after a piece of metal sheet material is rough finished at one work station, it may have to be moved to another for final finishing. To facilitate the movement, the sheet material is moved onto and across a transfer table.

As is commonly known, such transfer tables usually comprise a plurality of rollers or ball transfers. The material is moved across the rollers, in one direction usually, or across the balls in the "ball field" in more than one direction where required.

One of the problems with known transfer tables is that, in general, the scope of movement of a rotatable contact element (i.e., the ball or roller) forming the top of the table is necessarily restricted by the configuration of the transfer unit. In a roller type transfer unit, for example, material can be passed easily without sliding friction between the rollers and the material being moved, only in a direction perpendicular to the axis of rotation of the rollers. This severe restriction is partially avoided in the case of known ball transfers, such as disclosed in U.S. Pat. Nos. 1,963,956 and 3,132,904, upon which an article can be moved in substantially all directions, but problems still remain. These problems are principally difficulties imposed by dirt accumulation within the housing, by restrictions in permissible orientation of the device, and by sliding friction between the ball and its means of support within its housing. The ball transfer disclosed in U.S. Pat. No. 1,963,956 may be subject to excessive wear from dirt accumulation in the housing. In addition, it can only be employed with the ball oriented above the housing as shown in the drawings of that patent.

U.S. Pat. No. 3,132,904 discloses a type of ball transfer which is addressed to the problem of sliding friction. However, the device disclosed does not permit substantially frictionless universal rotation of the ball in the ball transfer. By "universal rotation" I mean rotation through 360° in all directions; by "substantially frictionless," I mean the absence of substantially all sliding friction between the ball and its supporting means. The concepts of sliding and rolling friction are well known and need not be detailed herein. They are applied in U.S. Pat. No. 3,132,904 to a ball transfer device.

With the exception of the ball transfer of U.S. Pat. No. 1,963,956 discussed above which is not wholly satisfactory in the respects noted, none of the prior art devices of which I am aware for supporting a ball in a ball transfer substantially eliminates sliding friction, the absence of which characterizes the universal ball transfer unit of my invention. This can be demonstrated by a consideration of a force F acting upon the top of a ball rotatably supported on three races, positioned equidistant from the center of the ball wherein the contact points between the ball and the race are offset from the pivot point of the race in the housing.

Assuming that the plane of a race is defined by the rotational axis of the race and the contact point between the race and the ball, it may be said that if the force is applied to the ball in a direction parallel to the plane of the race, the race will remain stationary. If the force is applied in a direction perpendicular to the plane of the race, the race will rotate with substantially no sliding friction. However, if the force is applied at any angle to the plane of the race other than the two cases just described, the race will rotate with a component of rolling friction and a component of sliding friction. In the case of a ball transfer having three or more races mounted on fixed pivots and in contact with a ball, therefore, there must be some sliding friction between the ball and one of the races at all times.

In the present invention, the ball is in contact with a supporting means which functions like a plurality of casters. As force is applied to the ball of my ball transfer, each roller in contact with the ball pivots to align itself in the new direction; hence, the ball can rotate universally with substantially no sliding friction.

My invention is a universal ball transfer unit comprising a ball, a housing, means for rotatably supporting the ball within the housing and means for retaining the ball on the support means and within the housing. The housing may be a part of or may be connected to any suitable base which may comprise a floor, a pipe, equipment, or any other structure. The housing may be rigidly connected to the base or it may include means, such as springs, for flexibly connecting the ball transfer to the base.

Preferably, sealed bearings are used in my ball transfer avoiding the need for lubrication and means for self-cleaning the ball transfer unit are provided to eliminate contaminants, such as dirt, which cause wear between the rotating elements of the ball transfer unit.

Hereinafter, I have set forth preferred embodiments of the invention. It should be understood that they are illustrative of the principles of the invention and that I do not intend to be limited to any specific application for the ball transfer unit.

Figure 1:
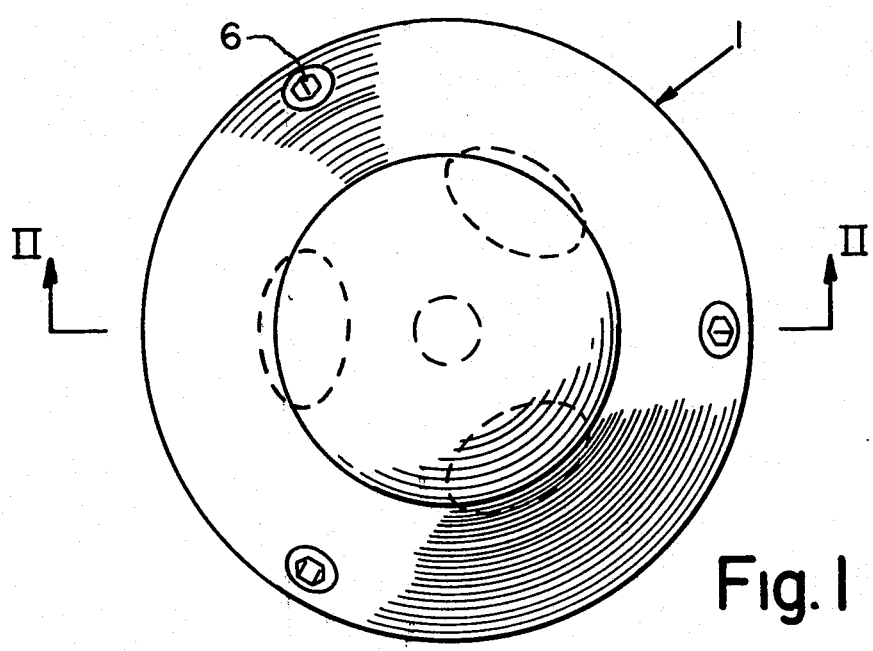
FIG. 1 is a plan view of a ball transfer unit in accordance with the invention.
Figure 2:
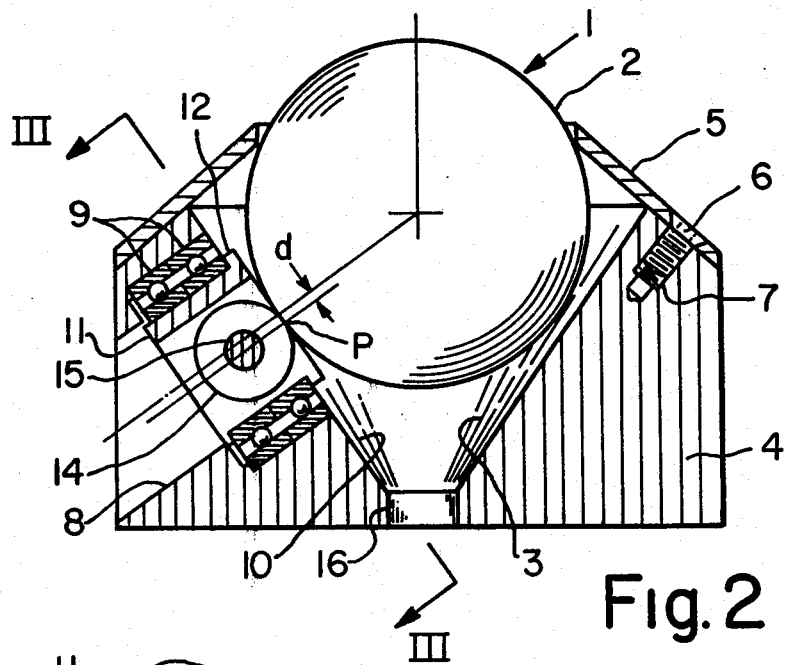
FIG. 2 is a cross-sectional view taken along lines II—II of FIG. 1.
Figure 3:
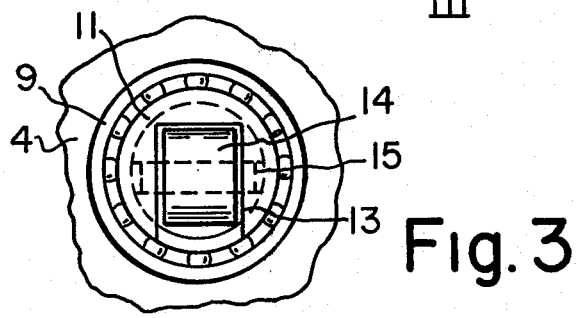
FIG. 3 is a partial cross-sectional view of the support means of the unit taken along the lines III—III of FIG. 2.

As shown in the drawings, the ball transfer unit 1 comprises a ball 2 positioned in a conical opening 3 in a housing 4. The ball is retained in the housing by a cover 5 which is secured by two or more flat head screws 6 in threaded openings 7.

There are three support means spaced at 120° intervals in the housing for supporting the ball 1. Each ball support means is positioned in a cylindrical bore 8 which extends completely through the housing 4.

One or more sealed ball bearings 9 are press-fit within the upper portion of the bore 8 adjacent a sidewall 10 of the opening 3. A cylindrical bushing 11 having a collar 12 is rotatably mounted within the bearing or bearings 9. The bushing 11 also has a through bore or milled opening 13 which forms a yoke. The longitudinal axis of the bushing is aligned with the center of the ball 2.

A roller 14, which is preferably a sealed roller, is rotatably mounted on a pin 15 which is secured in the upper portion of the bushing 11. The axis of the pin is perpendicular to the axis of the bushing. The axis of the pin is offset laterally from the axis of the bushing by a distance $d$, such that the surface of the roller 14 contacts a point P on the surface of the ball offset from the axis of the bushing 11.

The conical opening 3 in which the ball is disposed has a depending open end 16. Since dirt, oil or other contaminants can pass through the bores 8 and the open end 16, the ball transfer unit is substantially self-cleaning and abrasive wear on the elements of the ball transfer unit is nearly eliminated.

All of the elements of my ball transfer unit are preferably made of steel. The housing may be cast.

The construction of my ball transfer unit permits it to carry loads substantially in excess of ball transfers now available. One form of the ball transfer unit is capable of up to about 6000 pounds design loading.

A distinct advantage of the ball transfer unit of the invention is that it can be used satisfactorily in any orientation. For example, a number of ball transfers can be inverted from the position shown in the drawings and attached to the bottom of heavy equipment or other apparatus such as a heavy security safe, to enable such apparatus to be moved from one location to another in a manner similar to a furniture castor. Other features and advantages of the invention will be apparent to those skilled in the art.

Having described preferred embodiments of the invention, it is to be understood that the invention may be otherwise included within the scope of the appended claims.

I claim:

1. A ball transfer unit comprising:
   A. a ball;
   B. a housing;
   C. means for rotatably supporting the ball within the housing with substantially no sliding friction between the supporting means and the ball in any direction of rotation and in any orientation of the unit; and
   D. means for retaining the ball on the supporting means and within the housing.

2. A ball transfer unit as set forth in claim 1 wherein the means for supporting the ball comprises at least three ball support means, each comprising a cylindrical opening in the housing, at least one bearing within the opening, a bushing within the bearing and rotatable within the opening, and a roller pivotally mounted in the bushing for rotation perpendicular to the rotation of the bushing, the roller being in substantially point contact with the ball, the longitudinal axis of each bushing being aligned with the center of the ball and the roller being in substantially point contact with the ball, the point of contact of the ball and the roller being offset from said axis.

3. A ball transfer unit as set forth in claim 2 wherein the cylindrical opening extends completely through the housing to permit contaminants to pass out of the unit.

4. A ball transfer unit as set forth in claim 1 wherein the housing includes a conical opening for holding the ball, the smaller end of said opening forming a passage to permit contaminants to pass out of the unit.

5. A ball transfer unit as set forth in claim 2 wherein three support means are located at 120° intervals to each other around the housing and the longitudinal axis of each bushing passes through the center of the ball at 45° to the vertical.

6. A ball transfer unit as set forth in claim 1 wherein the retaining means is a cover secured to the housing and having an opening through which the upper portion of the ball extends.

7. A ball transfer unit comprising:
   A. a ball;
   B. a housing having a conical opening for holding the ball;
   C. at least three cylindrical openings extending at an angle to said conical opening, each having a bushing rotatably mounted therein and a roller pivotally mounted in the bushing for rotation perpendicular to the rotation of the bushing, the roller being in substantially point contact with the ball and the contact point being offset from the axis of the bushing so that movement of the ball in any direction is substantially free of sliding friction; and
   D. cover means secured to the top of the housing for retaining the ball on the rollers and within the housing.

8. A ball transfer unit as set forth in claim 7 wherein the bottom of the conical opening is open to permit contaminants to pass out of the housing.

9. A ball transfer unit as set forth in claim 7 wherein the bushing has a milled opening extending longitudinally of the bushing forming a yoke and the roller is rotatably mounted within the yoke on a pin the ends of which extend into the bushing.

* * * * *